UNITED STATES PATENT OFFICE.

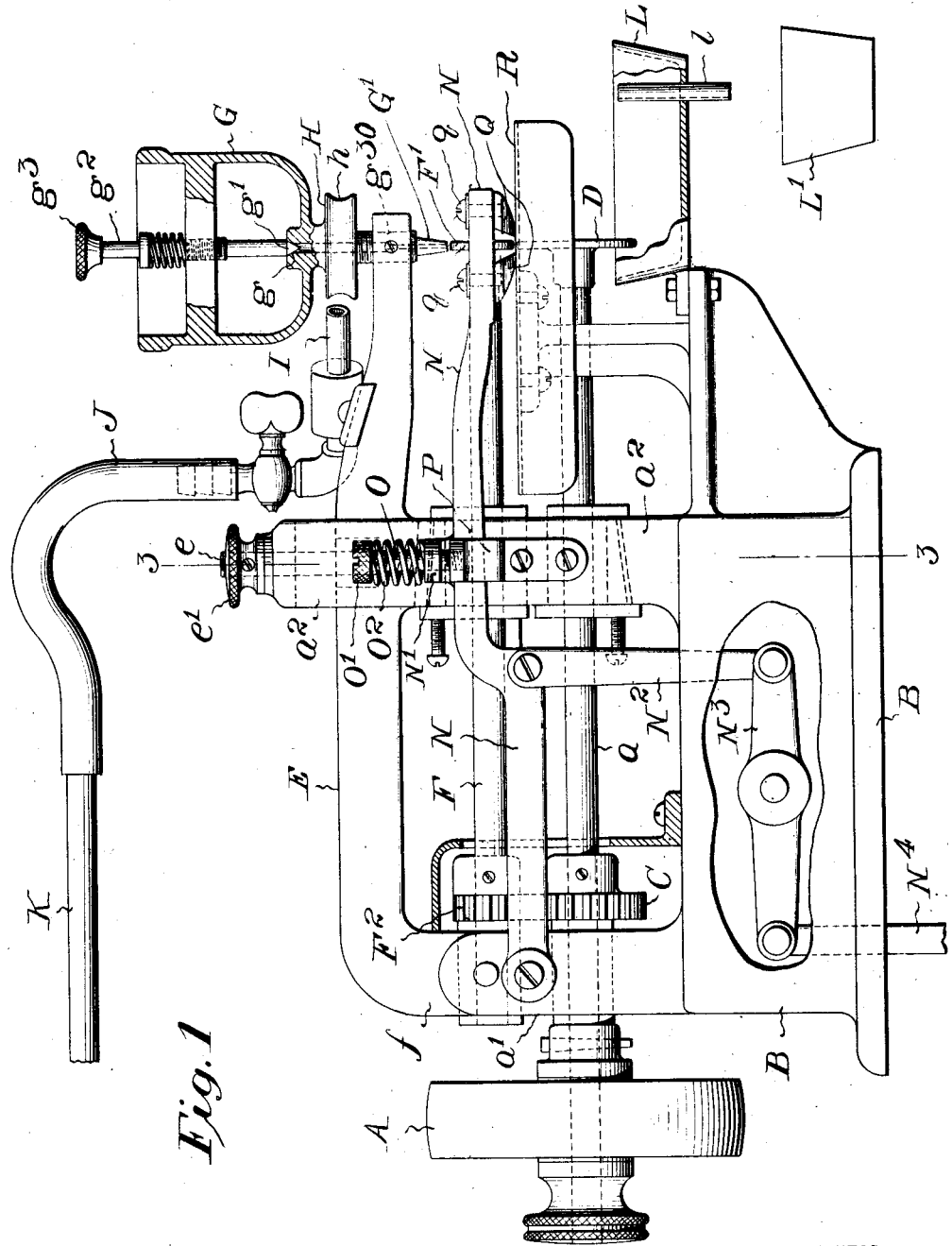

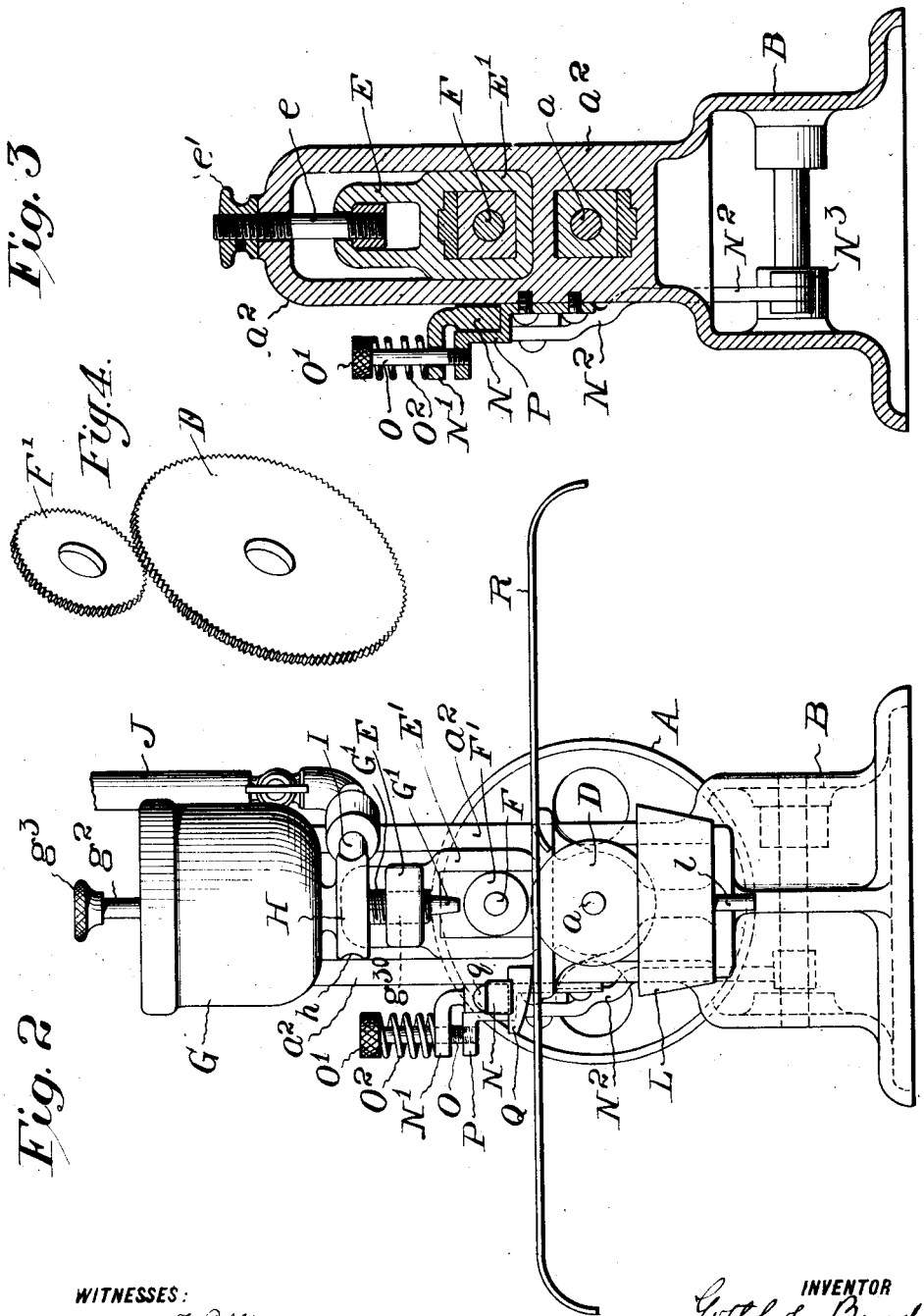

GOTTLOB BINDER, OF PHILADELPHIA, PENNSYLVANIA, ASSIGNOR, BY MESNE ASSIGNMENTS, TO AMERICAN LAUNDRY MACHINERY COMPANY, OF CINCINNATI, OHIO, A CORPORATION OF OHIO.

DAMPENING-MACHINE.

1,076,648.  Specification of Letters Patent.  Patented Oct. 21, 1913.

Application filed September 8, 1904. Serial No. 223,692.

*To all whom it may concern:*

Be it known that I, GOTTLOB BINDER, a citizen of the United States, residing at Philadelphia, county of Philadelphia, and State of Pennsylvania, have invented a new and useful Improvement in Dampening-Machines, of which the following is a full, clear, and exact description, reference being had to the accompanying drawings, which form a part of this specification.

My invention relates to that class of laundry machinery which is used for dampening the seams of articles or clothes, after the washing, starching and ironing, and which require to be bent at the seam. A particular type of this class of garments is collars.

The object of my invention is the production of a machine which will perform this dampening operation so that the article may be bent on the seam with certainty, and without risk of fracturing or breaking at the point where it is turned.

I will first describe the embodiment of my invention illustrated in the accompanying drawings, and then specifically point out the invention in the claims.

In the drawings:—Figure 1 is a side elevation part in section. Fig. 2 is an end elevation. Fig. 3 is a section on line 3—3, Fig. 1. Fig. 4 is a detail view of the dampening rolls.

A is a pulley driven by a belt (not shown) from the source of power (not shown).

B is the frame of the machine.

$a$ is the shaft of the pulley, which has a bearing in the projecting portion $a'$ of the frame, and the projecting portion or yoke $a^2$ of the frame. Upon this shaft $a$ is the gear C, and at the outer end of the shaft is the lower dampening roll D. The periphery of this lower dampening roll D is milled, thereby producing a roughened surface.

E is an arm pivoted in the projecting portion $a'$. This arm passes through the yoke portion $a^2$, and at that point has connected to it the rod $e$, which passes through the upper portion of the frame or yoke $a^2$, passing therethrough loosely. This rod $e$ has, at its upper end, the nut $e'$. The extent of the downward movement of the arm E on its pivot is limited by the nut $e'$ striking the yoke $a^2$.

F is a shaft having a bearing at one end, in a projection $f$, from the arm E. It also has a bearing in a downwardly projecting portion E' from the arm E at the yoke portion $a^2$ of the frame B. The outer end of this shaft F carries the upper dampening roll F', which, like the lower dampening roller D, is a metallic roller having its periphery milled, thereby also having a hard roughened surface.

$F^2$ is a gear on the shaft F meshing with the gear C on the shaft $a$.

In practice, for a reason hereinafter set forth, I make the dampening roller F' of smaller diameter than the dampening roller D.

The gear $F^2$ corresponds in diameter with the dampening roller F', and the gear C corresponds in diameter with the dampening roller D.

G is a reservoir having at its bottom the orifice forming a valve seat $g$ on which works the valve $g'$, having the valve stem $g^2$ provided with the roughened head $g^3$, so that the opening from the bottom of the reservoir G can be varied by operating the valve $g'$. From the bottom of the reservoir G, a pipe G' extends downward, its lower end being slightly above, and in line with, the periphery of the upper dampening roll F'. A portion of this pipe G' is threaded and works in a threaded orifice $g^{30}$ in the end of the arm E. By turning the reservoir G and its pipe G', the vertical position of the pipe G' with reference to the upper dampening roll F' may be adjusted.

Surrounding the pipe G', above the arm E is the disk H, having the grooved periphery $h$. In line with this grooved periphery $h$ is the outlet of a pipe I, which may be connected by the flexible pipe J with a gas pipe K, thus forming a burner in proximity to the periphery of the disk H. When the burner is in operation, the disk H will be heated and the water passing through the disk H from the reservoir G to the upper dampening roller F' will be heated. Further, by having this heating device in the shape of a disk with grooved periphery, the reservoir and its pipe may be made vertically adjustable within limits, without affecting the heating action upon the water.

L is a water reservoir having the overflow pipe $l$. This reservoir L is in such position that the dampening roller D partially revolves therein. As may be seen, when no collar or other article is passed between the rollers, the water passing from the reservoir G will fall upon the upper roll F', and, by reason of the milled surface, will be carried around and upon the roller D, and into the reservoir L, from which it can escape, if it accumulates too much, by means of the overflow pipe l, into a receptacle L'. When the collar is being passed between the rollers, the upper roller will receive water from the reservoir G, and the lower roller, revolving in the reservoir L, will also be independently and thoroughly moistened. Further, by making these rolls milled or roughened, in their action upon the collar, they, as it were, break down the starched surface, so that the dampening action is complete upon the collar enabling the collar or other article to be dampened to be properly turned over with certainty. Further, as I provide independent means of moistening both the upper and the lower dampening roller, both are, with absolute certainty, provided with sufficient moisture to produce the desired result upon both faces of the collar, or other article to be dampened, at the seam.

In order to provide a positive guide for the collar so that it will receive dampening action at the seam, and at the seam only, I provide the following mechanism: N is a lever which is pivoted to the projecting portion a' of the frame B. This lever is connected, by means of the link N², lever N³ and link N⁴, with a foot-treadle (not shown). This lever N has the projecting portion N'. A rod O passes through an orifice in the portion N' of the lever N, passing therethrough loosely, and the threaded end of this rod O works in a threaded orifice in the bracket P connected to the yoke or projecting portion a² of the frame B. The upper end of the rod O has a thumb-piece or head O'. Between this thumb-piece or head O' and the portion N' of the lever N, a coil-spring O² is placed. By turning this head or thumb-piece C the desired tension of the spring against the portion N' of the arm N may be obtained. The outer end of the arm N carries the pressure blocks Q, they being secured to this arm by bolts or rivets q. By operating the foot treadle the blocks may be lifted to insert the articles. Each pressure block has an upwardly inclined lower face (see Fig. 2) and an inwardly inclined inner face (see Fig. 1) forming between them a single contacting edge to contact with the article, placed upon the table R, on opposite sides of the seam. So that when a collar is placed upon the table R between these pressure blocks, they contact and grip the collar supported upon the table, at the seam, guiding it to the rolls in proper alinement to receive dampening only at the seam. In practice, the tension on the arm N need not be great enough to require the action of a foot-treadle, the collar or other article being inserted beneath the blocks by hand. The collar is then passed to the rolls which carry the collar forward, moistening it at the seam. The forward movement of the collar or other article between the rolls is a positive one and without slippage, the roughened surfaces merely acting to as it were, break up the starch particles so that the collar at the seam can be properly moistened.

I make the upper dampening roll F' of less diameter than the lower roll, so that I may operate the upper roll on short or sharp turns or edges in the seam of a collar, while the lower roll will give sufficient surface bearing.

In practice, the rod e is so adjusted that when no collar is between the rolls, the milled or roughened surfaces will not touch each other, so that there is at no time any intermeshing of the roughened surfaces of the dampening rolls.

Having now fully described my invention, what I claim and desire to protect by Letters Patent, is—

1. In a dampening machine, in combination, an upper and a lower roll, the upper roll having a hard roughened surface, a source of water supply, and connection between said source of water supply and the roughened surface of the upper roll.

2. In a dampening machine, in combination, an upper and a lower roll, each having a hard roughened surface, a source of water supply, and connection between said source of water supply and the roughened surface of the upper roll, and a water reservoir in which the lower roll revolves.

3. In a dampening machine, in combination, dampening rolls, a supporting table, a presser lever, and presser blocks connected to said lever, each of said presser blocks having a single contacting edge adapted to contact with the article on opposite sides of the seam.

4. In a dampening machine, in combination, dampening rolls, a supporting table, a presser lever, and presser blocks connected to said lever, each of said presser blocks having a single inclined contacting edge, adapted to contact with the article on opposite sides of the seam.

5. In a dampening machine, in combination, dampening rolls, a supporting table, a presser lever, and presser blocks connected to said lever, each block having an upwardly inclined lower surface and an inwardly inclined inner surface.

6. In a dampening machine, in combination, a pair of dampening rolls, shafts for said rolls, a gear on each shaft, said gears intermeshing and each corresponding in diameter with its corresponding dampening roll, the upper dampening roll being of less diameter than the lower dampening roll.

7. In a dampening machine, in combination, a pivoted arm, a shaft, and a dampening roll carried by said arm, and a water reservoir, an outlet pipe from said reservoir, said pipe being threaded, there being a threaded orifice in said arm in which the threaded pipe works.

8. In a dampening machine, in combination, a pivoted arm, a shaft, and a dampening roll carried by said arm, and a water reservoir, an outlet pipe from said reservoir, said pipe being threaded, there being a threaded orifice in said arm in which the threaded pipe works, a disk surrounding said pipe, and a burner in proximity to the periphery of said disk.

9. In a dampening machine, in combination, a pivoted arm, a shaft, and a dampening roll carried by said arm, and a water reservoir, an outlet pipe from said reservoir, said pipe being threaded, there being a threaded orifice in said arm in which the threaded pipe works, a disk having a grooved periphery surrounding said pipe, and a burner in proximity to the periphery of said disk.

10. In a dampening machine, in combination, a pivoted arm, a water reservoir, an outlet pipe secured to said reservoir, said pipe being threaded, there being a threaded orifice in said arm in which the threaded pipe works.

11. In a dampening machine, in combination, a pivoted arm, a water reservoir, an outlet pipe from said reservoir, said pipe being threaded, there being a threaded orifice in said arm in which the threaded pipe works, a disk surrounding said pipe, and a burner in proximity to the periphery of said disk.

12. In a dampening machine, in combination, a pivoted arm, a water reservoir, an outlet pipe from said reservoir, said pipe being threaded, there being a threaded orifice in said arm in which the threaded pipe works, a disk having a grooved periphery surrounding said pipe, and a burner in proximity to the periphery of said disk.

13. In a dampening machine, in combination, dampening rolls, a supporting table, a pivoted lever, presser blocks carried by said lever in advance of said rolls, each block having an upwardly inclined lower surface and an inwardly inclined inner surface.

In testimony of which invention, I have hereunto set my hand, at Philadelphia, on this 6th day of September, 1904.

GOTTLOB BINDER.

Witnesses:
ALBERT McEVORY,
M. M. HAMILTON.